US008918407B2

(12) United States Patent
Doshi et al.

(10) Patent No.: US 8,918,407 B2
(45) Date of Patent: Dec. 23, 2014

(54) CASE ANALYSIS SYSTEM

(75) Inventors: Jatin Doshi, Maharashtra (IN); Ambati Sailaja, Phoenix, AZ (US); Aparna De, Kalkata (IN)

(73) Assignee: Tata Consultancy Services Limited, Mumbai, Maharashtra (IN)

( * ) Notice: Subject to any disclaimer, the term of this patent is extended or adjusted under 35 U.S.C. 154(b) by 0 days.

(21) Appl. No.: 13/407,555

(22) Filed: Feb. 28, 2012

(65) Prior Publication Data

US 2013/0060787 A1    Mar. 7, 2013

(30) Foreign Application Priority Data

Apr. 26, 2011    (IN) .......................... 1322/MUM/2011

(51) Int. Cl.
*G06F 17/30*    (2006.01)
*G06Q 10/10*    (2012.01)
*G06Q 10/06*    (2012.01)

(52) U.S. Cl.
CPC ................ *G06Q 10/06* (2013.01); *G06Q 10/10* (2013.01)
USPC .......................................... 707/749; 707/758

(58) Field of Classification Search
USPC ........................................................ 707/749
See application file for complete search history.

(56) References Cited

U.S. PATENT DOCUMENTS

2010/0104200 A1\*  4/2010  Baras et al. .................... 382/209
2010/0106752 A1\*  4/2010  Eckardt et al. ................ 707/805

\* cited by examiner

*Primary Examiner* — Usmaan Saeed
*Assistant Examiner* — Jagdish Pandya
(74) *Attorney, Agent, or Firm* — Blakely, Sokoloff, Taylor & Zafman LLP

(57) ABSTRACT

Systems and methods for cases based analysis are described. In one implementation, a new case-based document having static attributes and dynamic attributes is received. Once the static and the dynamic attributes are received, the static attributes of the received new case-based document is compared with the static attributes of one or more previously processed case-based documents. Based on the comparison, a sub-set of case-based documents is generated. For the generated sub-set, the dynamic attributes of the new case-based document are compared with the dynamic attributes of the sub-set of case-based documents. Based on the comparison, previously processed case-based documents, if any, which are found to be similar to the new case-based document are identified.

17 Claims, 5 Drawing Sheets

CASE ANALYSIS SYSTEM

TECHNICAL FIELD

The present subject matter relates, in general, to a process of case analysis and, in particular, to automated systems for assistance in the process of decision making based on case-based reasoning.

BACKGROUND

Making logical decisions is important in all processes where knowledge of the given area to make informed decisions is accounted for. In such a logical decision making process, specific information on a problem domain is to be correlated against background knowledge to achieve a consistent logical decision. Generally, a decision making process involves providing a solution to a problem by first understanding the problem and then arriving on a solution based on either prior knowledge or experience. More often, the decision is based on or assisted by similar previously encountered problems and their solutions.

Case-based reasoning is one of the well known techniques used in the process of decision making. Case-based reasoning relies on prior experiences to understand and solve new problems. In case-based reasoning, an individual refers a previous similar problem and leverages the solution of the previous problems to take decision for the current problem. Generally, for a domain specific problem, a logical decision may be performed manually by skilled and experienced individuals using case-based reasoning. Due to the requirement of prior knowledge of similar problems, individuals have to depend on their experience and capability to remember similar problem scenarios for efficient and quality decisions.

With the advancement of technology, automated systems have come into existence. These systems perform the decision making process automatically. Automated decision making, performed by such systems, determine a similarity between known similar problems and analyze a new case based on predefined rules and algorithms.

SUMMARY

This summary is provided to introduce concepts related to a case analysis system. These concepts are further described below in the detailed description. This summary is not intended to identify essential features of the claimed subject matter nor is it intended for use in determining or limiting the scope of the claimed subject matter.

In one implementation, a new case-based document having static attributes and dynamic attributes is received. Once the static and the dynamic attributes are received, the static attributes of the received new case-based document are compared with the static attributes of one or more previously processed case-based documents. Based on the comparison, a sub-set of case-based documents is generated. For the generated sub-set, the dynamic attributes of the new case-based document are compared with the dynamic attributes of the sub-set of case-based documents.

BRIEF DESCRIPTION OF THE DRAWINGS

The detailed description is provided with reference to the accompanying figures. In the figures, the left-most digit(s) of a reference number identifies the figure in which the reference number first appears. The same numbers are used throughout the drawings to reference like features and components.

FIG. 4 (b) illustrates method for evaluation of a dynamic similarity score, in accordance with an implementation of the present subject matter

DETAILED DESCRIPTION

Figure 1:
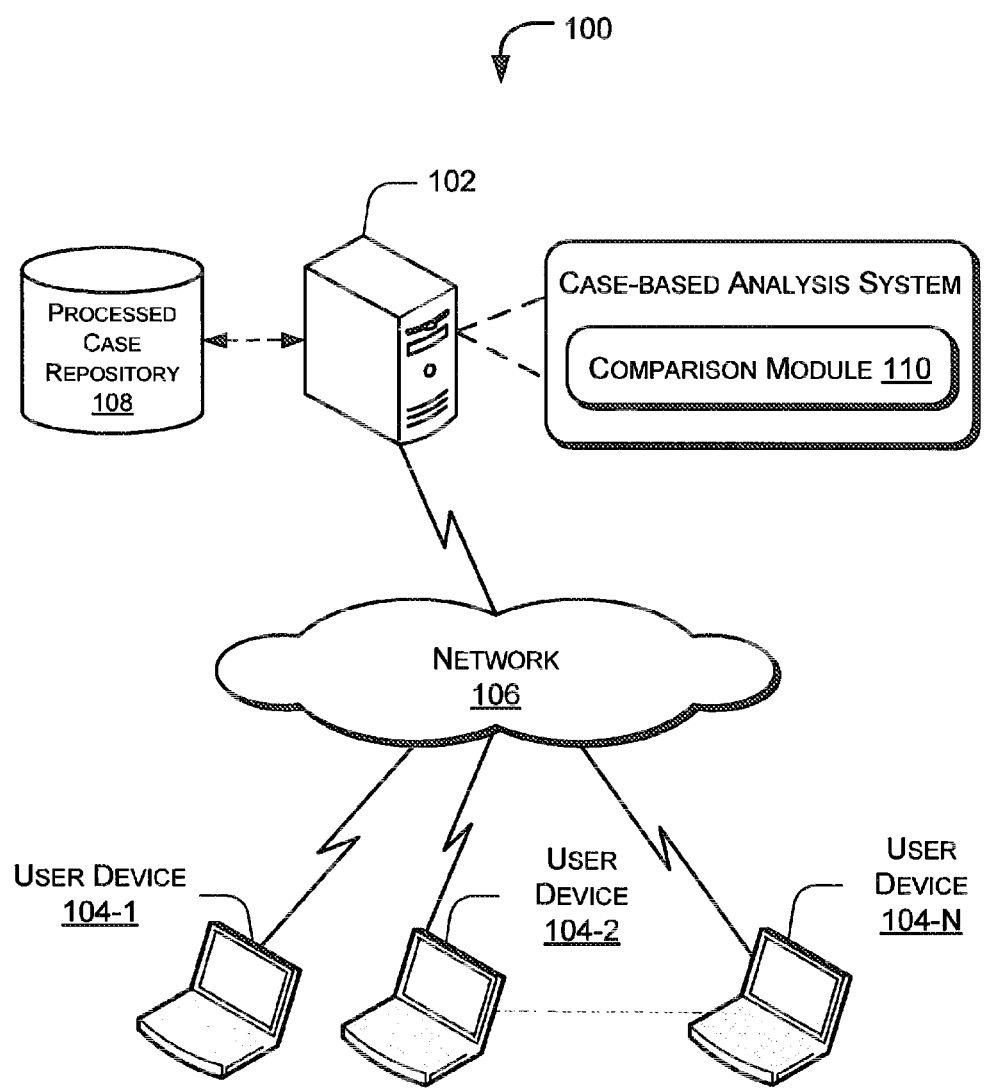
FIG. 1 illustrates an exemplary system implementing a case analysis system, in accordance with an embodiment of the present subject matter.

Systems and methods for analyzing a plurality of case-based documents (referred to as cases, hereinafter) are described. Conventional mechanisms may involve manual decision making processes that can be carried out by individuals based on their experience and prior knowledge of the field. The experience and the prior knowledge could be manifested through previous case-based documents or recorded cases, and the corresponding corrective action taken for such cases. In such a scenario, every particular case may be associated with related conditions and variables, which are represented in terms of attributes of the respective case.

For example, in case of insurance policies, an underwriter considers attributes such as age, gender, past medical history, region of habitation, etc., while comparing a case with old cases to decide or compute insurance coverage and related liabilities. Similarly, in case of bridge construction, an engineer may consider aspects related to bridge design, such as, length, height, width, load bearing capacity, cantilever bridge, suspension bridge, etc., to compare them with previous cases and already deduced conclusion, taken measures and made decisions.

Therefore, a quality decision depends on the experience of an individual and their ability to understand new problems in terms of old experiences. An individual might examine numerous problems of similar nature during the course of decision making. For example, an underwriter who examines insurance applications might underwrite several similar applications. In such a scenario, a consistent decision by him/her for similar problems, involving same or similar factors, becomes a necessity. A limited capability of referencing previous cases and experience of individuals limit their capability of consistent and informed decision To maintain consistency in the decisions taken by individuals, it is a challenge for individuals to be aware of and remember the decision of cases already analyzed. However, with an increase in the number of cases that have to be analyzed, consistency of the solutions provided as well as the efficiency with which the solutions are provided may become a concern. Furthermore, such decision making would also be dependent on the experience of the individual involved in the decision making process.

Conventional automated case-based reasoning systems provide similar previously handled cases to a user for assistance. Such systems receive inputs for a particular case in terms of associated attributes and compare these attributes with attributes associated with prior processed cases to provide previously handled cases with similar attributes. However, the present systems are based on a static set of attributes that fail to search for the previously handled cases effectively. Furthermore, such systems may also not be extendible to multiple domains and different set of attributes. For example, an automated case-based reasoning system implemented in a healthcare facility may perform analysis based on fixed attributes such as age, gender, disease, blood pressure, symptoms, etc. The system may provide non-related results if implemented in car insurance underwriting domain. Moreover, the attributes pertinent to healthcare, like blood pressure, might be un-related to other domains such as car insurance, architectural projects, etc.

The embodiments of a case analysis system described herein address the aforementioned issues in addition to providing assistance to individuals of different domains in many different ways. In one embodiment, the case analysis system provides a user with cases related to a new case-based document (referred to as new case hereinafter), based on the attributes of the case. Initially, one or more possible attributes associated with a case of a selected domain are obtained. As will be appreciated, the attributes may be based on the domain, and may characterize a case of the domain. For example, in healthcare, the attributes can include name, age group, height, weight, blood group, etc. Similarly, for architectural projects, the attributes may include, structure type, structure dimensions, material used, geographic location, etc.

Further, the attributes associated with every domain are structured in sets of static and dynamic attributes. Static attributes are identified as attributes which may be common across all cases within a particular domain, while the dynamic attributes are attributes specific to every case, and may vary from case to case within a domain. The case analysis system receives a new case from a user. The new case may include both, the associated static and the dynamic attributes. Instead of a comparison based on all the attributes, the system performs the comparison based on common and case specific attributes to reduce the time required for comparison of all attributes, and thereby providing a result more accurately and efficiently.

The attributes of the new case and the attributes of the previously processed cases are then compared. In one implementation, for a particular domain selected, static attributes specific to the domain are received, and the static attributes thus received for the new case are compared with static attributes of previously processed cases to obtain a sub-set of previously processed cases. The obtained set of previously processed cases constitutes a sub-set of cases, which have similar static attributes as that of the new case.

Further, the dynamic attributes relevant for the new case are determined based on the obtained sub-set of previously processed cases. Although, the dynamic attributes associated with the domain are already known, only relevant or the pertinent dynamic attributes are utilized or selected. Dynamic attributes relevant for the new case are identified based on the dynamic attributes of the obtained sub-set of previously processed cases. In one embodiment, where the sub-set of previously processed cases may constitute different dynamic attributes, the combination of all available dynamic attributes is considered as relevant dynamic attributes and is prompted to the user for entry in the new case.

Subsequently, the determined dynamic attributes are compared with the dynamic attributes of the previously processed cases. Based on the comparison, one or more previously processed cases that are most similar to the new case are shortlisted and provided to the user. The final set of the shortlisted previously processed cases provides the user with cases of the selected domain, having similar static and dynamic attributes. The structuring of attributes into different sets based on their occurrence and relevance to the domain improves the accuracy and efficiency of the system.

In one embodiment, the first sub-set of obtained previously processed cases and the final set of shortlisted previously processed cases are determined based on an evaluated similarity scores. A similarity score is evaluated for the previously processed cases based on the similarity between the attributes of the previously processed case and the attributes of the new case. In said embodiment, every previously processed case is assigned an evaluated similarity score after comparison of the attributes. Based on the comparison of static attributes of the new case with the static attributes of previously processed cases, a static similarity score is computed and associated with every previously processed case. Similarly, subsequent to the comparison of dynamic attributes with the dynamic attributes of previously processed cases, a dynamic similarity score is associated with each of the previously processed cases, present in the obtained sub-set of previously processed cases.

In another embodiment, the combination of the static similarity score and the dynamic similarity score is utilized to compute a total similarity score for the obtained sub-set of previously processed applications. The total similarity score calculated and associated with the sub-set of previously processed cases indicates the extent of similarity between the new case and the previously processed case. In one embodiment, previously processed cases with an associated total similarity score of greater value than a pre-defined threshold total similarity score are shortlisted. It would be noted that previously processed cases with total similarity score below a pre-defined total similarity score, say a value 80, or between certain pre-defined total similarity score range, say between values 40 to 60, can also be short listed. Further, in one embodiment, if the user receives the final shortlisted previously processed cases which are not similar to the new case and are not a perfect match, the new case is stored and the repository consisting previously processed cases is updated.

The disclosed system(s) can be implemented as a variety of devices, such as servers, mainframe computers, personal computers, laptops, and personal digital assistants (PDAs) desktop computers, hand held device, multiprocessor systems, microprocessor based programmable consumer electronics, laptops, network computers, minicomputers, mainframe computers, and the like.

While aspects of described system and methods for case analysis system can be implemented in any number of different computing systems, environments, and/or configurations, the embodiments of the system are described in context of the following exemplary systems.

FIG. 1 illustrates a network environment 100 implementing a case-based analysis system 102, according to an embodiment of the present subject matter. The network environment 100 includes the case-based analysis system 102, multiple user devices 104-1, 104-2, . . . , 104-N coupled to the case-based analysis system 102 via a network 106. For the purpose of explanation, the user devices 104-1, 104-2, . . . , 104-N are collectively referred to as the user device(s) 104. It will be understood that in case different organizations specializing in multiple domains implement the case-based analysis system 102, the user devices 104 can be user devices of users of the organization. Further, user devices 104 are capable of utilizing the case-based analysis system 102 for multiple domains as well as for a particular domain, as desired by a user or an organization.

The network 106 may be a wireless network, wired network or a combination thereof. The network 106 can be implemented as one of the different types of networks, such as intranet, local area network (LAN), wide area network (WAN), the Internet, and such. The network 106 may either be a dedicated network or a shared network representing an association of the different types of networks that use a variety of protocols, for example, Hypertext Transfer Protocol (HTTP), Transmission Control Protocol/Internet Protocol (TCP/IP), etc., to communicate with each other.

The case-based analysis system 102 and the user devices 104 can be implemented as any of a variety of conventional computing devices, including, for example, servers, a desktop PC, a notebook or a portable computer, a workstation, a mainframe computer, a mobile computing device, an entertainment device, and an Internet appliance. Further, the case-based analysis system 102 may be coupled to one or more application servers (not shown in the figure) for hosting case-based analysis system 102 and for providing and receiving data pertaining to the new cases, to and from the user devices 104. The application servers, which may be distributed locally or across one or more geographic locations, can be physically or logically connected to the case-based analysis system 102. However, it will be understood that the case-based analysis system 102 can also be implemented as an application server.

In one embodiment, the case-based analysis system 102 is associated with a processed case repository 108, which stores previously processed cases pertaining to different domains and fields. In one implementation, the processed case repository 108 may be logically segregated depending on the different domains. The cases included within the processed case repository 108 may further be characterized by a plurality of static attributes and dynamic attributes associated to different domains, and the previously processed cases associated with such domains. Although the processed case repository 108 is illustrated external to the case-based analysis system 102, it will be understood that the processed case repository 108 may be internal to the case-based analysis system 102 as well. The processed case repository 108 can be implemented as, for example, a single repository, a distributed repository or a collection of distributed repositories.

As indicated above, the domain of interest governs the static and dynamic attributes associated with a case. Static attributes include attributes which are common across all cases of a particular domain whereas, the dynamic attributes include attributes that are specific to the case of the domain. For example, the static attributes in the domain of bridge construction may include, but are not limited to, bridge length, bridge height, bridge type, and its load capacity, material used. The dynamic attributes in the same domain but related to, for example, suspension bridges may include, but are not limited to, suspension angle, number of cables to distribute load, and load per cable.

The case-based analysis system 102 includes, amongst other things, a comparison module 110. The comparison module 110 may be provided in an external storage media, which may interface with the case-based analysis system 102. In one implementation, the comparison module 110 compares the static and the dynamic attributes of the new case with static and dynamic attributes of the previously processed cases, stored in the processed case repository 108.

In another implementation, the comparison module 110 compares total similarity scores of different previously processed cases during one analysis session. An analysis session can be understood as a session during which previously processed cases are analyzed against a new case. Therefore, every time a new case is compared to the previously processed cases stored in the processed case repository 108, a new analysis session is created. It would be understood that the similarity scores, such as, static similarity score, dynamic similarity score, and the total similarity score associated with each previously processed case are valid only for one analysis session and are re-computed for every new analysis session.

Further, a template including the static attributes related to a domain is pre-defined and available with the case-based analysis system 102. The comparison module 110 is also configured to compare the static attributes based on the template and analyze those attributes that remain unanswered. Unanswered attributes are attributes which have either been left blank by the user in the new case or are blank in the previously processed case with which the new case is compared to or are blank in both the new case and the previously processed case. Since, the comparison of attributes also include unanswered attributes, the case-based analysis system 102 provides the user with more accurate and more similar case results, thereby increasing the efficiency of the case analysis system. The comparison module 110 is also configured to compare relevant dynamic attributes of the new case with the dynamic attributes of the obtained sub-set of previously processed cases, to evaluate a dynamic similarity score. Based on the comparisons, the case-based analysis system 102 evaluates the similarity scores, such as the static and the dynamic similarity scores, associated with the previously processed cases.

The case-based analysis system 102 enables a user or an organization to utilize the system for multiple domains. However, it will be understood that the user devices 104 may be configured to utilize only some selected domains. In such a scenario, the case-based analysis system 102 provides different access of previously processed cases related to different domains to different users. For example, there may be a user who utilizes only a single domain of healthcare, while an organization may utilize five domains described in the case-based analysis system 102 including the healthcare domain. In such a scenario, the case-based analysis system 102 would provide access to previously processed cases related to healthcare to both the user and the organization, but would only provide the access to previously processed cases related to other four domains to the organization only.

Further, the case-based analysis system 102 can be implemented across multiple organizations catering to different domains centrally, or can be implemented within an organization providing access to multiple users of the organization. While implemented within an organization, the case-based analysis system 102 might cater single or multiple domains. It would be understood that the case-based analysis system 102, when implemented within an organization, may provide access to different domains to different users.

Figure 2:
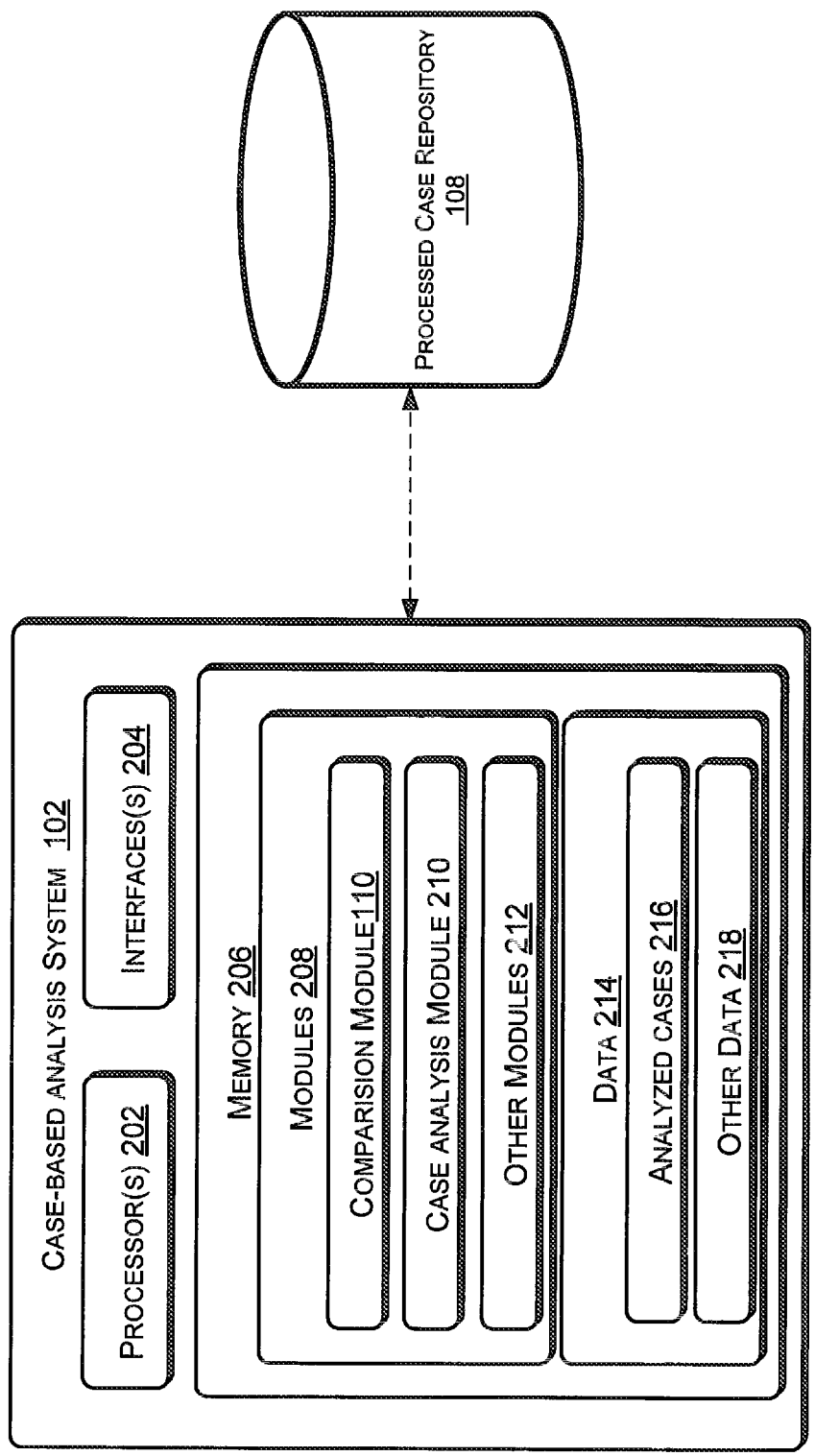
FIG. 2 illustrates components of the case analysis system, in accordance with an embodiment of the present subject matter.

FIG. 2 illustrates exemplary components of the case-based analysis system 102, according to an implementation of the present subject matter. The case-based analysis system 102 includes one or more processor(s) 202, interface(s) 204, and a memory 206, coupled to the processor(s) 202.

The processor 202 can be a single processing unit or a number of units, all of which could include multiple computing units. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions and data stored in the memory 206.

The interfaces 204 may include a variety of software and hardware interfaces, for example, interfaces for peripheral device(s), such as a keyboard, a mouse, an external memory, and a printer. Further, the interfaces 204 may enable the case-based analysis system 102 to communicate with other computing systems, such as web servers and external databases. The interfaces 204 can facilitate multiple communications within a wide variety of networks and protocol types, including wired networks, for example local area network (LAN), cable, etc., and wireless networks such as Wireless LAN (WLAN), cellular, or satellite. For the purpose, the interfaces 204 may include one or more ports for connecting a number of computing systems to each other or to another server computer. In one implementation, the case-based analysis system 102 communicates with the processed case repository 108 and the application servers via the interfaces 204.

The memory 206 may include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 includes module(s) 208 and data 214. The modules 208, amongst other things, include routines, programs, objects, components, data structures, etc., which perform particular tasks or implement particular abstract data types. The data 214 serves, amongst other things, as a repository for storing data processed, received and generated by one or more of the modules 208.

The modules 208 in addition to the comparison module 110, includes a case analysis module 210 and other module(s) 212. The other modules 212 may include programs that supplement applications on the case-based analysis system 102, for example, programs in the operating system. The data 214 includes data generated as a result of the execution of one or more modules 208 and stored as analyzed cases 216. The data 214 also includes other types of data, stored as other data 218, which may be used by the case-based analysis system 102. As will be appreciated by a person skilled in the art, the various modules provided above can either be implemented individually or can be implemented collectively as one module, without deviating from the scope of the present subject matter.

The case-based analysis system 102 performs analysis of cases which may pertain to different domains. The case-based analysis system 102 can be accessed by the user devices 104, either within the same or different domains, through use of the interface(s) 204. As described previously, the case-based analysis system 102 is associated with the processed case repository 108. The processed case repository 108 stores a plurality of previously processed cases, i.e., cases for which decisive actions were taken or for which most optimal solutions were adopted.

As also indicated previously, the previously processed cases can each be identified based on one or more attributes. It should be noted that each of such attributes may qualify one or more cases. Furthermore, one or more attributes may be such that they may be unique to a domain to which the case relates. Based on such attributes, previously processed cases that are similar to the case under consideration can be searched for. Depending on the similarity of the new case with the previously processed cases, the solutions or decisions associated with previously processed cases can be extended to the case under consideration.

In one implementation, the attributes associated with a case under consideration include attributes such as static attributes or dynamic attributes, as discussed in the description of FIG. 1. For purposes of understanding only, and not intended for defining, static attributes can be considered as attributes which are common to all cases of a domain. As also indicated previously, the attributes which are case specific can be considered as dynamic attributes. Based on the static and dynamic attributes, a domain specific template consisting exhaustive static and dynamic attributes can be created. The template created for every domain can be stored in the other data 218. For the purpose of illustration, a template related to the domain of life insurance may include attributes such as name, age, gender, as static attributes, and attributes such as, heart condition, kidney condition, diseases as the dynamic attributes. It would be understood by a person skilled in the art that the templates of different domains may contain certain overlapping attributes, which might be common for different cases related to different domains.

In operation, a user of the system 102, say through one of the client devices 104, selects the domain in which a new received case is to be analyzed. As would be appreciated, the analysis may entail a search for similar cases that have been previously processed. Once the relevant domain, say insurance, is selected, the associated template is obtained and provided to the user for the new case. It should be noted that "insurance" as domain is considered for the purpose of explanation only and not as a limitation.

In the obtained template, the user may provide an entry or a value for the attributes included in the template. The values or the entries for the attributes in the template are based on the associated attribute values for the new case. It will be appreciated that the user might choose not to provide an entry/value for a particular attribute. For example, a template provided to the user contains one or more attributes such as name, age, gender, blood pressure, heart rate, and address. It may be the case that the user might provide values for the one or more attributes and search for related previously processed cases. In another scenario, the user might only provide values for selected few attributes, e.g., blood pressure and heart rate, to search for previously processed cases with similar blood pressure and heart rate entry.

Once the values for the attributes are provided, the comparison module 110 compares the attributes of the received new case and the attributes of the previously processed cases stored in the processed case repository 108. The comparison is performed based on the selected domain and a value of each of the attributes provided by the user. In one implementation, only the static attributes are made available to a user for submitting a value. The comparison module 110 based on the comparison between the attribute values provided for the template and the attribute values associated with the previously processed cases determines a similarity score for each of the compared cases. In one implementation, the similarity score can be stored in analyzed cases 216. In another implementation, the similarity score for each of the compared cases is based on a similarity score associated with the static attributes as well as on the similarity score of the dynamic attributes.

It should be understood that every time a new case is compared to the previously processed cases stored in the processed case repository 108, a new analysis session is created and a new set of static, dynamic, and total similarity scores are associated with the previously processed cases. Once the attribute values are provided by the user, the comparison module 110 compares the static attributes of the new case with the static attributes of the previously processed cases. In one implementation the comparison module 110 performs the comparison based on a match weight and a mismatch weight associated with the attributes. The match weight and the mismatch weight can be defined by a user.

For example, consider a new case within actuarial domain. The relevant template for the present domain, in the present case, may consist of seven (7) static attributes. The system 102 provides a user with a template consisting of these static attributes to provide values for these attributes. The system 102 may further associate a match and mismatch weight to each of the attributes included in the template. The comparison module 110 compares the static attributes of the new case with the static attributes of previously processed cases, case by case, i.e., if the processed case repository 108 comprises of n processed cases within the actuarial domain, the comparison module 110 first compares the static attributes of the new case with the $1^{st}$ case among the n processed cases and then with the $2^{nd}$ case and so on until the $n^{th}$ case.

While performing the comparison, the comparison module 110 compares each static attribute of the new case with the static attribute of the $1^{st}$ case to evaluate a similarity factor for each of the static attributes. Based on the similarity factor evaluated for each attribute and a match or mismatch weight associated with the attribute, the case analysis module 210 evaluates a static similarity score for the $1^{st}$ case among the n previously processed cases of actuarial domain. Thereafter, in a similar manner, a static similarity score is evaluated for each of the n available previously processed cases.

In one implementation, for each static attribute, the case analysis module 210 evaluates the said similarity factor based on a 'K Nearest Neighbor' (KNN) algorithm. It would be understood that the value provided by a user for every attribute may vary and may be provided in different data types. The different types of entry/value may include data types such as, but not limited to, integer, boolean, unordered enumeration, ordered enumeration, symbol, and, strings.

In another implementation, the case analysis module 210 evaluates similarity score based on a similarity factor for different attributes with entries of different data types. For example, the method of similarity factor evaluation of an attribute with entry of an integer data type may vary with the method of similarity factor evaluation of an attribute with value of a string. In one embodiment, the similarity factor evaluated for an integer data type is based on the difference of the values of the integers compared. For example, the integer value of an attribute in the new case is V and the integer value of the same attribute in a previously processed case is W. In said example, the analysis module 210 may evaluate the similarity factor for the attribute, based on the relation:

$$Sim(V, W) = 100 - \frac{[100 * absolute(V - W)]}{Range}$$

where, Sim(V,W) is the similarity factor and 'Range' is the range of values the attribute can include. In one example, the entry for an attribute age may vary between 0 and 120. In such a scenario, the range may be considered to be 120. It will be understood that the range of an attribute is pre-defined. In one implementation, the range is user-defined. Although in this example, the method of evaluation of similarity factor is defined for integer data types, it will be understood that similar methods appropriate to different data types may be utilized for the evaluation of similarity factor of other attributes.

As provided previously, for the static similarity score evaluation, the case analysis module 210 utilizes the match and mismatch weight associated with each attribute. In one implementation, it may be possible that the user fails to provide a value for few of the attributes in the new case. Furthermore, it may also happen that one of the attributes within the previously processed cases, which is compared with the attribute of the new case, is blank or is devoid of any value. For example, for a domain l, there may be 10 pre-defined static attributes, and the user may choose to provide an entry/value only for 8 attributes. In such a scenario, the 2 attributes for which an entry/value is not provided by the user are considered as unanswered or blank attributes. Also, in another example, a user may provide value for all the 10 attributes but, during the comparison of these 10 attributes with an already processed case, 4 attributes may be blank in the entry of previously processed case. In such a scenario, the 4 attributes unanswered in the previously processed case are considered as the unanswered attributes.

In such a case, the case analysis module 210 may evaluate the static similarity score based on similarity factor of attributes (answered and/or unanswered) and the associated weight (match and/or mismatch). In one implementation, the static similarity score is evaluated first by considering answered attributes and then the unanswered attributes. For the answered attributes, in one implementation, the case analysis module 210 uses the following relation for evaluating a similarity score of an attribute:

Attribute similarity score=[similarity factor*match weight of the attribute]    (1)

Subsequently, the evaluated attribute similarity score of each answered attribute is used to evaluate the static similarity score for the previously processed case being compared. In one implementation, the evaluation of static similarity score is done based on the relation:

Static similarity score=Static similarity score+attribute similarity score    (2)

where the initial static, dynamic and total similarity score of every previously processed case is zero, and the above relation is iterated for all answered attributes. For the purpose of illustration, if there are 6 answered attributes in a new case, each with an attribute similarity score of a, b, c, d, e, f respectively, the case analysis module 210 evaluates the static similarity score in 6 steps. After the first step, the static similarity score is a. After the second step, the static similarity score becomes a+b, and after the sixth step, the static similarity score is a+b+c+d+e+f+g. The static similarity score thus generated is stored in the analyzed cases 216, in the memory 206.

In one implementation, for the identified unanswered static attributes during the first phase of comparison, the case analysis module 210 amends the evaluated static similarity score based on certain defined conditions. In one implementation, two options, option A and option B are used. Option A accounts the situations when the unanswered attribute is left blank in the new case but present in previously processed case. Whereas, option B accounts the situation when the unanswered attribute is blank in the previously processed case being compared but is present in the new case. For both the above options, option A and option B, the case analysis module 210 amends the static similarity score based on the relation:

Static similarity score=Static similarity score−[100*mismatch weight of attribute]    (3)

However, in another implementation, an option C is utilized, where for the unanswered attributes identified blank in both, the new case as well as the previously processed case being compared, the case analysis module 210 amends the static similarity score based on the relation:

Static similarity score=Static similarity score+[100*match weight of attribute]    (4)

Although the option A, Option B and option C are used by the case analysis module 210 by default for the purpose of evaluating static similarity score based on unanswered attributes; however, in one implementation, the system 102 allows a user to choose the evaluation of static similarity score for the unanswered attributes. For each new case, the user may define the criteria on which the static similarity score should be amended, if in case, the attributes are identified as unanswered attributes. This capability may be exercised by a user by choosing a mismatch option for the new case. For example, if a user chooses to implement option A or B, i.e., mismatch option 1, for a new case, the analysis module 210 would amend the static similarity score according to relation (3), but only if the user has left the attribute blank and value exits for the attribute in the previously processed case, or the value of attribute is provided by the user and is blank in the previously processed case.

However, in such a scenario, if the value is blank in both, the new case and previously processed case being compared, the analysis module 210 would not amend the static similarity score. Further, the analysis module 210 would amend the static similarity score based on the identified unanswered attributes when the value is blank in both, the new case and previously processed case being compared if the user chooses to amend the static similarity score based option C, i.e., relation (4), referred to as mismatch option 2.

Based on the evaluation of static similarity score of previously processed cases, the analysis module 210 creates a sub-set of previously processed cases from amongst the compared previously processed cases available in the previously processed case repository 108. In one implementation, the sub-set of previously processed cases is obtained after filtering the compared processes cases, based on a pre-defined threshold similarity score. In said implementation, all the previously processed cases with static similarity score greater than a pre-determined threshold are selected to form a sub-set of previously processed cases. In one implementation, the obtained sub-set of previously processed cases is stored in analyzed cases 216. However, in another implementation, the obtained sub-set of previously processed case can also be stored within the processed case repository 108, under a temporary folder created for every analysis session.

Further, subsequent to the formation of a sub-set of previously processed cases, the system 102 performs the comparison of dynamic attributes. At this stage, the system 102 provides the user with one or more relevant dynamic attributes that can be selected by the user for searching the relevant case. Relevant dynamic attributes for a new case are identified based on the obtained sub-set of previously processed cases. For example, in a domain l, consider a scenario where there are 15 possible dynamic attributes already known to the system 102, and two previously processed cases are obtained as a result of the comparison of the static attribute. Consider the first previously processed case present in the sub-set of obtained cases to contain dynamic attributes 2, 4, and 9 out of possible 15 dynamic attributes, and the second previously processed case present in the sub-set of obtained cases to contain dynamic attributes 4, 5, 13, and 15. In such a scenario, the analysis module 210 would prompt the user to provide an entry/value for the dynamic attributes 2, 4, 5, 9, 13, and 15.

In one implementation, the comparison module 110 compares the relevant dynamic attributes of a new case to the dynamic attributes of the obtained sub-set of previously processed cases in a similar manner as explained earlier for the static attributes. Subsequent to the comparison, analysis module 210 evaluates a similarity factor for relevant dynamic attributes of the new case. Further, based on the similarity factor, the analysis module 210 evaluates a dynamic similarity score for each of the previously processed case present in the obtained sub-set of previously processed cases.

In one implementation, a match category set (referred to as match category hereinafter) with each of the dynamic attributes of a domain can also be defined. For some scenarios, the match category associated with each dynamic attribute may be used for determining the total similarity score for the new case. In the present example, the match category may include confirm, disqualify, default, or both. If a match category specified as confirm is assigned to a dynamic attribute, and if the value for the new case matched with the value for the previously processed cases, the comparison module 110 rejects the static similarity score of the previously processed case and assigns a total similarity score of 100 to the previously processed case. Similarly, if a match category is set to disqualify, and the comparison module 110 determines the value of the dynamic attribute of the new case and the respective dynamic attribute of the previously processed case being compared to be dissimilar, the static similarity score of the previously processed case is rejected and the analysis module 210 assigns a total similarity score of −100 to the previously processed case.

Similarly, if a match category default is assigned to a dynamic attribute, the dynamic similarity score is evaluated in a similar manner as computed for static attributes, as described above. In such a scenario, the comparison module 110 computes a similarity factor associated with attributes defined with the match category default. The analysis module 210 thereafter evaluates the attribute similarity score based on the similarity factor and the match/mismatch weight associated with each dynamic attribute. Further, based on the attribute similarity score, the analysis module 210 evaluates the dynamic similarity score. It would be understood that for the purpose of attribute similarity score evaluation, in one implementation, the analysis module 210 may use relation (1). However, for the purpose of dynamic similarity score evaluation, the analysis module 210 may use the relation:

$$\text{Dynamic similarity score} = \text{Dynamic similarity score} + \text{attribute similarity score} \quad (5)$$

It would now be understood that if the match category is chosen to be both, for a dynamic attribute, in cases when the attribute of the new case matches the respective attribute of a previously processed case, the analysis module 210 assigns the total similarity score of 100 to the previously processed case. And, in such a scenario, when the attribute of the new case mismatches the respective attribute of a previously processed case, the analysis module 210 assigns a total similarity score of −100 to the previously processed case.

Further, based on the static similarity score and the dynamic similarity score, the analysis module 210 evaluates a total similarity score for the obtained sub-set of previously processed cases. In one implementation, the analysis module 210 evaluates the total similarity score based on the relation:

$$\text{Total similarity score} = \frac{[\text{Static similarity score} + \text{Dynamic similarity score}]}{100 * \text{number of answered attributes}} \quad (6)$$

In another implementation, the analysis module 210 filters the obtained sub-set of previously processed cases based on a threshold total similarity score. In said implementation, the analysis module 210 provides the previously processed cases with total similarity score greater than the pre-defined threshold. However, it would be understood that the filtering can be done based on a range as well. In such a scenario, the analysis module 210 would provide only such cases to a user that fall under the pre-defined range of total similarity score.

Although, for the purpose of explanation, the evaluation of different similarity scores, such as the static similarity score, dynamic similarity score, attribute similarity score, and the total similarity score has been explained with reference to particular methods, based on few relation, however, it would be understood that these methods, relations, and explanations have only been included for the purpose of explanation only, and in no way limit the scope of the present subject matter. Other mechanisms for calculating similarity scores for static attributes and dynamic attributes would still be within the scope of the present subject matter.

Once the total similarity score is obtained, the previously processed cases which are similar to the new case can be determined and a list of such cases is provided to the user. In one implementation, the analysis module 210 updates the processed case repository 108. The new cases that are analyzed on the system 102 and which do not result in a perfect match with any of the previously processed cases are saved in the previously processed case repository 108 for the purpose of referencing and future comparison with new cases.

Figure 3:
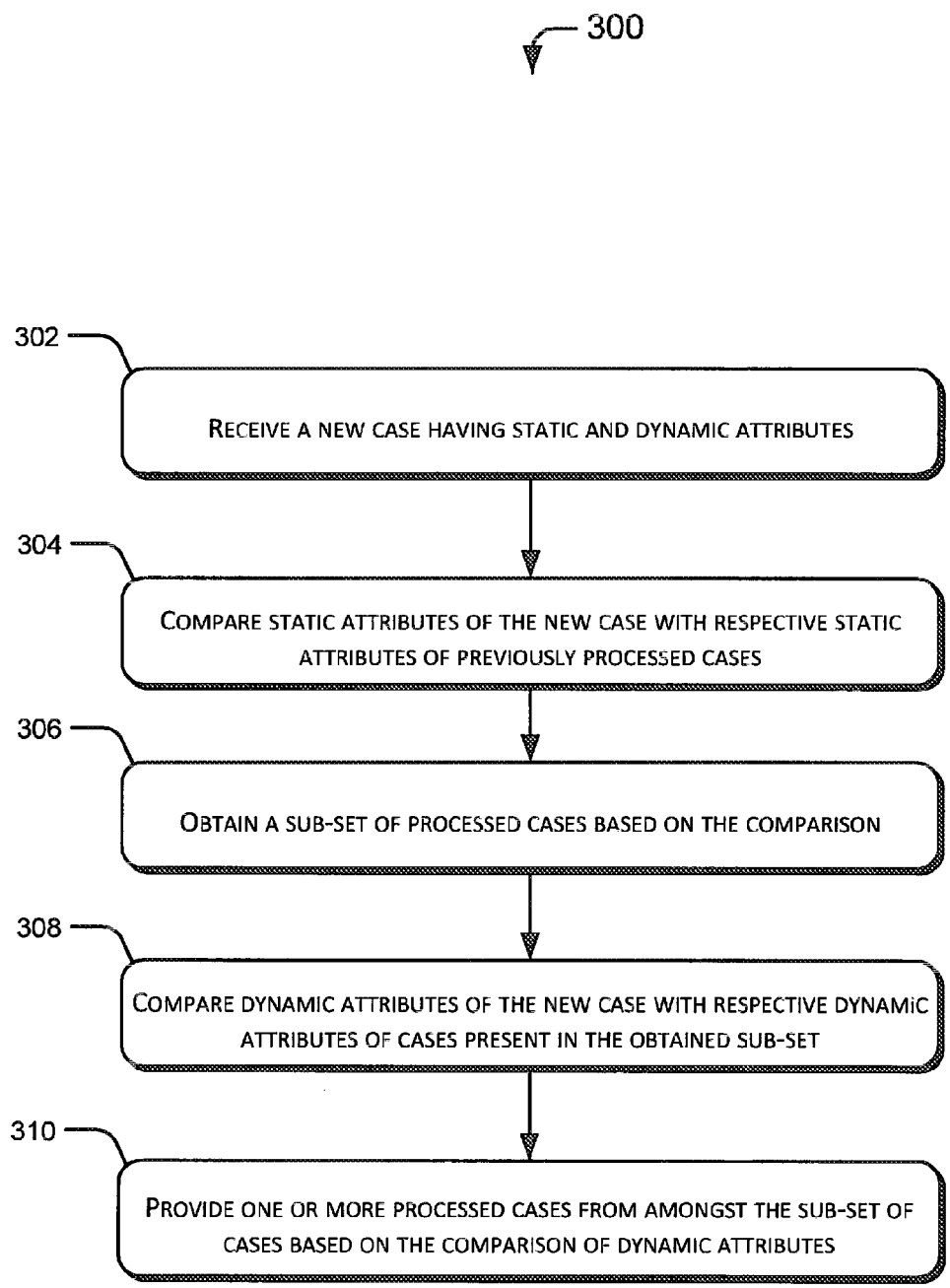
FIG. 3 illustrates an exemplary method for analyzing and comparing a new case-based document with previously processed case-based documents, in accordance with an implementation of the present subject matter.

FIG. 3 illustrates an exemplary method 300 for analyzing and comparing a new case with previously processed cases based on the associated attributes, in accordance with an implementation of the present subject matter. The exemplary method(s) may be described in the general context of computer executable instructions. Generally, computer executable instructions can include routines, programs, objects, components, data structures, procedures, modules, functions, etc., that perform particular functions or implement particular abstract data types. The method(s) may also be practiced in a distributed computing environment where functions are performed by remote processing devices that are linked through a communications network. In a distributed computing environment, computer executable instructions may be located in both local and remote computer storage media, including memory storage devices.

The order in which the method(s) are described is not intended to be construed as a limitation, and any number of the described method blocks can be combined in any order to implement the method, or an alternative method. Additionally, individual blocks may be deleted from the methods without departing from the spirit and scope of the subject matter described herein. Furthermore, the method(s) can be implemented in any suitable hardware, software, firmware, or combination thereof. The method(s) are explained with reference to a case-based analysis system 102, however, it will be understood that the methods 300, 400(1) and 400(2) can also be implemented for a plurality of case analysis systems.

At block 302, a new case having static and dynamic attributes is received. The static and the dynamic attributes can be pre-determined for a particular domain. In one implementation, the case-based analysis system 102 receives the static attributes and the dynamic attributes. Examples of such static attributes includes, bridge height, bridge load capacity, bridge type, etc, that may be associated with the domain related to bridge construction projects. Similarly, the dynamic attributes for the same domain and suspension bridge field may include, but not limited to, number of suspension cables, load per cable, etc. The received attributes are stored in the other data 218.

At block 304, static attributes of the new case are compared with static attributes of previously processed cases. In one implementation, the comparison module 110 compares the static attributes of the new case with respective static attributes of previously processed cases.

At block 306, a sub-set of previously processed cases is obtained based on the comparison of the static attributes. For example, based on the comparison, the analysis module 210 evaluates a static similarity score for each of the previously processed cases. The analysis module 210 filters the previously processed cases based on the static similarity score. In one implementation, the analysis module 210 selects all the previously processed cases with static similarity score greater than a pre-defined value. The obtained sub-set of previously processed case, in one implementation is stored in the analyzed cases 216.

At block 308, the dynamic attributes of the new case are compared with the dynamic attributes of the cases present in the obtained sub-set. In one implementation, the comparison module 110 compares the said dynamic attributes. Based on the comparison, the analysis module 210 evaluates a dynamic similarity score for each of the cases present in the obtained sub-set. In one implementation, the dynamic similarity score is stored in the data 214.

At block 310, one or more previously processed cases from amongst the sub-set of cases are provided, based on the comparison of dynamic attributes. In one implementation, the analysis module 210 evaluates a total similarity score based on static and dynamic similarity score assigned to the previously processed cases. Further, the analysis module 210 selects one or more cases from the obtained sub-set of cases. In one example, the analysis module 210 selects the said cases based on a minimum threshold. All cases with a total similarity score greater than the pre-defined threshold are selected and provided to a user.

Figure 4:
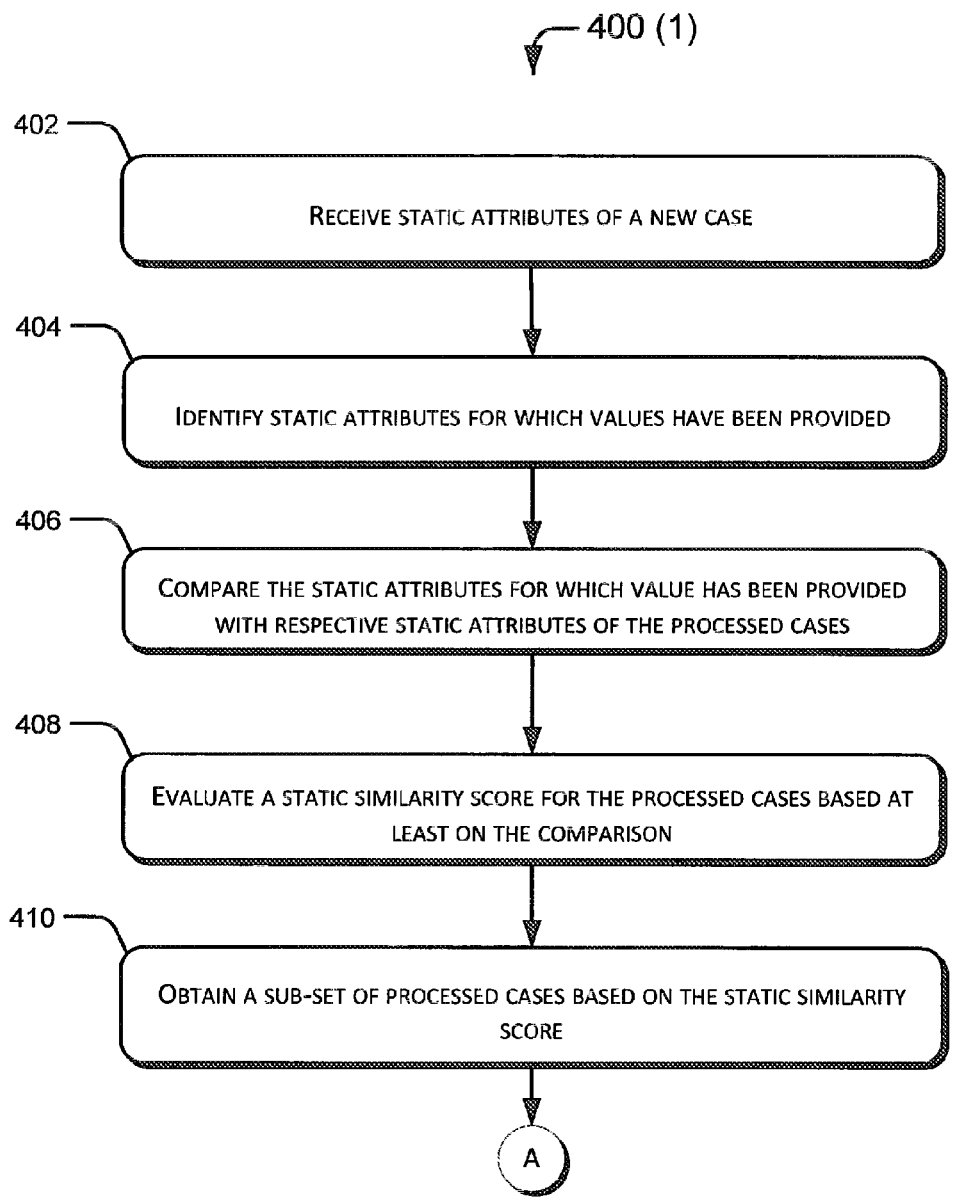
FIG. 4 (a) illustrates a method for evaluation of a static similarity score, in accordance with an implementation of the present subject matter.
Figure 4:
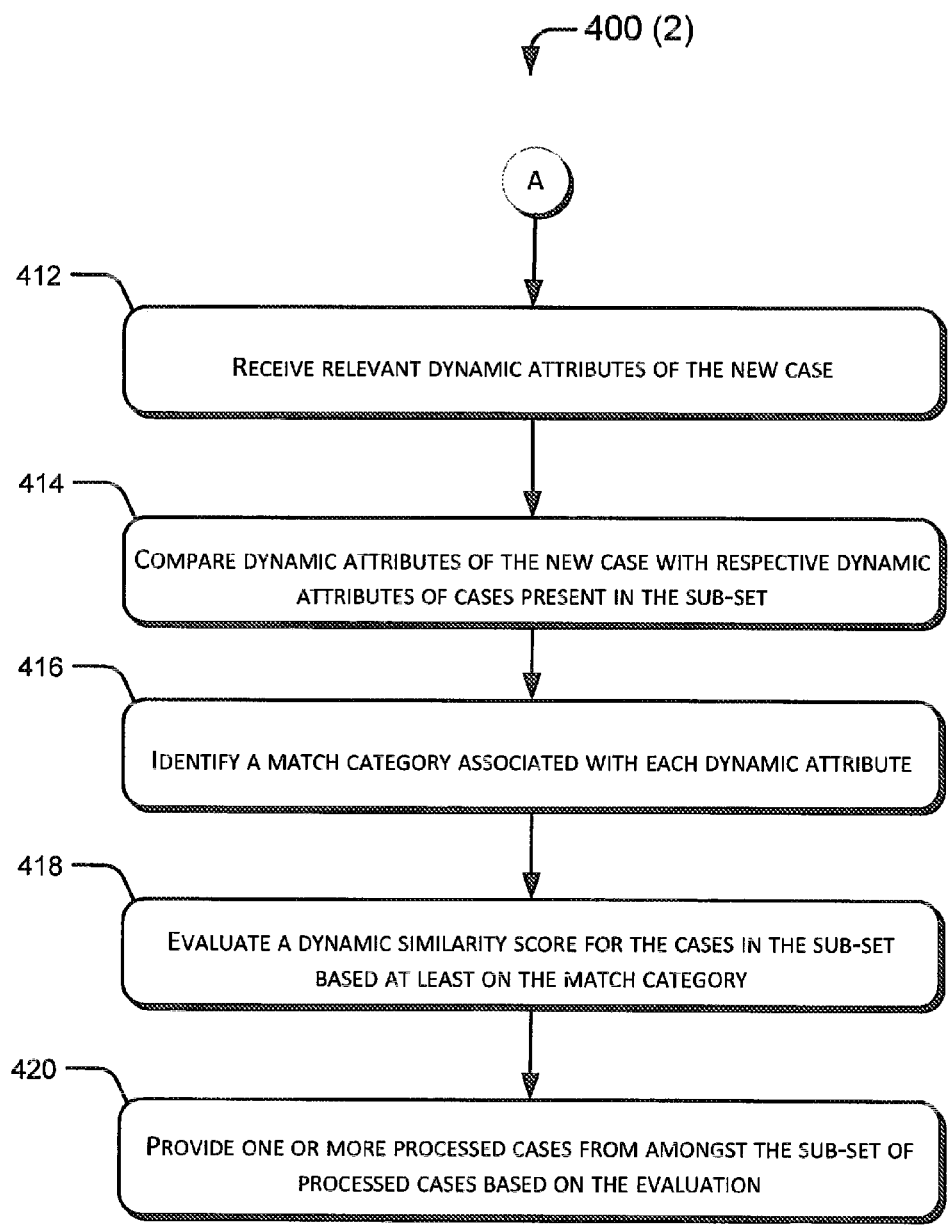

FIGS. 4 (a) and 4(b) illustrates methods 400(1) and 400(2), for evaluation of static similarity score and obtaining a sub-set of previously processed cases, in accordance with an implementation of the present subject matter.

At block 402, static attributes of a new case are received. In one implementation, the value/entry for the static attributes of a particular selected domain is received. The static attributes are the attributes which are common across all cases of a particular domain and in one implementation, the static attributes of the selected domain are already known to the system 102. Static attributes for one domain may differ with static attributes of another domain. However, in one implementation, few static attributes of one domain may overlap with few static attributes of another domain.

At block 404, attributes for which values have been provided are identified. In one implementation, the user provides values/entries for some of the static attributes and leaves the rest blank for the new case. In such a scenario, the analysis module 210 identifies the blank attributes as the unanswered attributes. The analysis module 210 identifies the attributes for which a value/entry has been provided by the user as the answered attributes. However, the attributes for which no value/entry exists in the previously processed case but the user has provided an entry/value for the new case are also accounted as the unanswered static attributes. It would be understood that the attributes for which the value/entry neither exists in the new case, nor in the previously processed case are also identified as the unanswered attributes.

At block 406, the static attributes of the new case for which attribute values have been provided are compared with static attributes of the previously processed cases. In one implementation, the previously processed cases are stored in the processed case repository 108. The comparison module 110 compares the answered static attributes of the new case with respective static attributes of a previously processed case.

At block 408, a static similarity score is evaluated for the previously processed cases based at least on the comparison. In one implementation, the analysis module 210 evaluates the static similarity score based on the comparison of answered attributes. However, in another implementation, the static similarity score may be evaluated based on the comparison of answered attributes and on the unanswered attributes. The analysis module 210 utilizes the match weight and the mismatch weight associated with the attributes for the evaluation of static similarity score. The contribution of unanswered attributes to the static similarity score may be based on pre-defined relation of the system 102, or may be defined by a user using the mismatch option.

At block 410, a sub-set of processed cases is obtained based on the static similarity score. In one implementation, the analysis module 210 selects the previously processed cases with an associated static similarity score greater than a pre-determined threshold static similarity score.

FIG. 4 (b) illustrates method 400 (2), for evaluation of dynamic similarity score and providing one or more previously processed cases to a user, in accordance with an implementation of the present subject matter.

At block 412, dynamic attributes relevant to the new case are received. In one implementation, the system 102 determines the dynamic attributes relevant to the new case-based on the obtained sub-set of cases. The dynamic attributes present in the obtained sub-set of cases are provided to a user for providing an entry/value to the relevant dynamic attributes.

At block 414, the dynamic attributes of the new case are compared with respective dynamic attributes of cases present in the obtained sub-set. In one implementation, the comparison module 110 compares the said dynamic attributes.

At block 416, a match category associated with each dynamic attribute is identified. In one implementation, the match category may include, confirm, disqualify, default and both and is associated with dynamic attributes of a domain by an administrator. A match category enables the analysis module 210 to evaluate the dynamic similarity score of the previously processed case accordingly. However, in absence of a match category, selected by user, associated with a dynamic attribute, a match category of default is assigned to the attribute and the similarity for that attribute, between the new case and a case from amongst the obtained sub-set is evaluated in a similar manner as for a static attribute.

At block 418, a dynamic similarity score is evaluated for the cases present in the obtained sub-set based on the match category. In one implementation, the analysis module 210 evaluates the dynamic similarity score based on the identified match category. However, in absence of an associated match category, as selected by the user, the dynamic similarity score evaluation is based on the default method, that is similar to the method of evaluation of static similarity score.

At block 420, one or more previously processed cases from amongst the sub-set of previously processed cases are provided to the user. In one implementation, the analysis module 210 evaluates a total similarity score based on the static and dynamic similarity score assigned to the previously processed cases. Further, the analysis module 210 selects one or more cases from the obtained sub-set of cases. In one example, the analysis module 210 selects the said cases based on a minimum threshold. All cases with a total similarity score greater than the pre-defined threshold are selected and provided to a user.

Although embodiments for methods and systems for multi-tenancy have been described in a language specific to structural features and/or methods, it is to be understood that the invention is not necessarily limited to the specific features or methods described. Rather, the specific features and methods are disclosed as exemplary embodiments for case analysis.

We claim:

1. A computer implemented method for identifying previously processed case-based documents similar to a new case-based document, the method comprising:

receiving the new case-based document having at least one static attribute and at least one dynamic attribute, wherein the at least one static attribute is common to a plurality of previously processed case-based documents, and wherein the at least one dynamic attribute is specific to the new case-based document;

selecting a domain for the new case-based document based at least in part on a user input, wherein in the selected domain, a plurality of static domain attributes and a plurality of dynamic domain attributes are structured in different sets based on their occurrence and relevance to the selected domain;

receiving one or more static attributes specific to the selected domain of the new case-based document;

comparing the one or more static attribute of the new case-based document with corresponding static attributes of the plurality of previously processed case-based documents;

obtaining a sub-set of case-based documents from amongst the plurality of previously processed case-based documents based on the comparison of the one or more static attribute, wherein the sub-set of case-based documents represent a group of documents similar to the new case-based document with respect to the one or more static attribute;

receiving one or more dynamic attributes relevant to the new case-based document from amongst a plurality of dynamic attributes of the obtained sub-set of case-based documents, wherein the receiving comprises determining the one or more dynamic attributes by combining the plurality of dynamic attributes of the obtained sub-set of case-based documents when the plurality of dynamic attributes of the obtained sub-set of case-based documents are not relevant to the new case-based document;

comparing the one or more dynamic attribute of the new case-based document with corresponding dynamic attribute of the sub-set of case-based documents; and identifying presence of at least one previously processed case-based document from the sub-set of case-based documents based on the comparison of the one or more dynamic attributes, wherein the at least one previously processed case-based document is a document similar to the new case based document with respect to the one or more dynamic attribute.

2. The method as claimed in claim 1, wherein the identifying comprises determining absence of previously processed case-based documents.

3. The method as claimed in claim 1, wherein the comparing the one or more static attributes of the new case-based document is based on a similarity of data types of values associated with the one or more static attributes.

4. The method as claimed in claim 1, wherein the comparing the one or more static attributes of the new case-based document comprises evaluating a similarity factor for each of the one or more static attributes of the new case-based document to generate a static similarity score for each of the plurality of previously processed case-based documents.

5. The method as claimed in claim 1, wherein the comparing the one or more dynamic attributes of the new case-based document comprises evaluating a similarity factor for each of the one or more dynamic attributes of the new case-based document to generate a dynamic similarity score for each of the plurality of previously processed case-based documents, wherein the dynamic similarity score is calculated based on a match category set parameter.

6. The method as claimed in claim 1, wherein the obtaining comprises:
    identifying at least one unanswered static attributes from amongst the at least one static attribute of the new case-based document and the plurality of previously processed case-based documents; and
    computing a static similarity score corresponding to each of the plurality of previously processed case-based documents based at least on a mismatch option associated with the new case-based document.

7. The method as claimed in claim 6, wherein the computing comprises:
    identifying one or more answered static attributes from the compared static attributes of the new case-based document and the plurality of previously processed applications; and
    further re-computing the static similarity score corresponding to each of the plurality of previously processed case-based documents based at least on one of a match weight and a mismatch weight associated with each of the answered static attribute.

8. The method as claimed in claim 6, wherein the identifying is based on a total similarity score determined for the sub-set of case-based documents based at least on a match category associated with each of the one or more dynamic attributes.

9. The method as claimed in claim 8, further comprising setting the total similarity score to 100, in response to the match category being confirm, and on matching of at least one value associated with one of the static attribute and the dynamic attribute of the new case-based document, with the value associated with one of the static attribute and the dynamic attribute of the previously processed case-based documents.

10. The method as claimed in claim 8, further comprising setting the total similarity score to −100, in response to the match category being disqualify and on mismatch of at least one value associated with one of the static attribute and the dynamic attribute of the new case-based document, with the value associated with one of the static attribute and the dynamic attribute of the previously processed case-based documents.

11. The method as claimed in claim 6, wherein a value of the match category is one of confirm, disqualify, both and default.

12. A case analysis system comprising:
    a processor; and
    a memory coupled to the processor, wherein the memory comprises:
        a comparison module configured to:
            receive a new case-based document including at least one static attribute and at least one dynamic attribute, wherein the at least one static attribute is common to a plurality of previously processed case-based documents, and wherein the at least one dynamic attribute is specific to the new case-based document;
            select a domain for the new case-based document based at least in part on a user input, wherein in the selected domain, a plurality of static domain attributes and a plurality of dynamic domain attributes are structured in different sets based on their occurrence and relevance to the selected domain;
            receiving the one or more static attributes specific attributes specific to the selected domain of the new case-based document;
            compare one or more static attributes of the new case-based document with corresponding static attribute of the plurality of previously processed case-based documents; and
            comparing the at least one dynamic attribute of the new case-based document with corresponding dynamic attribute of the sub-set of case-based documents; and
        an analysis module configured to:
            compute a static similarity score for at least one previously processed case-based document based at least in part on a mismatch option, wherein the mismatch option is associated with each new case-based document, wherein the static similarity score is indicative of similarity among static parameters;
            obtain a sub-set of case-based documents from the at least one previously processed case-based document based on the associated static similarity score, wherein the sub-set of case-based documents represent a group of documents similar to the new case-based document with respect to the one or more static attributes; and
            evaluate a dynamic similarity score for the sub-set of case-based documents based at least in part on a match category, wherein the match category is associated with each dynamic attribute associated with the selected domain.

13. The case analysis system as claimed in claim 12, wherein the analysis module is configured to receive a setting for the mismatch option for unanswered attributes.

14. The case analysis system as claimed in claim 12, wherein the analysis module is further configured to compute the static similarity score based on one of a match weight and a mismatch associated with answered attributes.

15. The case analysis system as claimed in claim 12, wherein the match category is one of confirm, disqualify, both and default.

16. The case analysis system as claimed in claim 12, wherein the analysis module selects the sub-set case-based documents from the at least one previously processed case-based document based on a pre-determined threshold static similarity score.

17. A non-transitory computer-readable medium having computer-executable instructions that when executed perform acts comprising:
    receiving a new case-based document having at least one static attribute and at least one dynamic attribute, wherein the static attribute is common to a plurality of previously processed case-based documents and wherein the dynamic attribute is specific to the new case-based document;
    selecting a domain for the new case-based document based at least in part on a user input, wherein in the selected domain, a plurality of static domain attributes and a plurality of dynamic domain attributes are structured in different sets based on their occurrence and relevance to the selected domain;
    receiving one or more static attributes specific to the selected domain of the new case-based document;

comparing the one or more static attributes of the new case-based document with respective static attributes of a plurality of previously processed case-based documents;

obtaining a sub-set of case-based documents from the plurality of previously processed case-based documents based on the comparison of the static attributes, wherein the sub-set of case-based documents represent a group of documents similar to the new case-based document with respect to the one or more static attributes;

receiving one or more dynamic attributes relevant to the new case-based document from amongst a plurality of dynamic attributes of the obtained sub-set of case-based documents, wherein the receiving comprises determining the one or more dynamic attributes by combining the plurality of dynamic attributes of the obtained sub-set of case-based documents when the plurality of dynamic attributes of the obtained sub-set of case-based documents are not relevant to the new case-based document;

comparing the one or more dynamic attributes of the new case-based document with respective dynamic attributes of the sub-set of case-based documents; and providing a result indicative of at least one processed case-based documents from the sub-set of case-based documents based on the comparison of the dynamic attributes that are similar to the new case-based document, wherein the at least one previously processed case-based document is a document similar to the new case based document with respect to the one or more dynamic attributes.

* * * * *